(12) United States Patent
Alvarez-Diez et al.

(10) Patent No.: US 8,104,040 B2
(45) Date of Patent: Jan. 24, 2012

(54) AUTOMATIC SPEED AND PROCESSOR CAPACITY UPGRADE ACCORDING TO THE WORKLOAD

(75) Inventors: Adrian Alvarez-Diez, Boeblingen (DE); Michael Groetzner, Stuttgart (DE); Ruediger Schulze, Boeblingen (DE); Horst Sinram, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 11/947,374

(22) Filed: Nov. 29, 2007

(65) Prior Publication Data

US 2009/0144734 A1 Jun. 4, 2009

(51) Int. Cl.
*G06F 9/46* (2006.01)
(52) U.S. Cl. ...................................................... 718/104
(58) Field of Classification Search .................. None
See application file for complete search history.

(56) References Cited

U.S. PATENT DOCUMENTS

| 5,473,773 A | 12/1995 | Aman et al. | |
|---|---|---|---|
| 2006/0037022 A1* | 2/2006 | Byrd et al. | 718/104 |
| 2006/0059492 A1* | 3/2006 | Fellenstein et al. | 718/104 |
| 2006/0095917 A1* | 5/2006 | Black-Ziegelbein et al. | 718/104 |

OTHER PUBLICATIONS

Wyman, et al. "Multiple-Logical-Channel Subsystems: l zSeries I/O Scalability and Connectivity" IBM Journal of Research and Development, vol. 48, No. 3/4, 2004.

* cited by examiner

*Primary Examiner* — Emerson Puente
*Assistant Examiner* — Gregory Kessler
(74) *Attorney, Agent, or Firm* — Cantor Colburn LLP; Steven Chiu

(57) ABSTRACT

A method for automatically adding capacity to a computer for a workload is provided. Metric information is received, defined in a policy, about a workload running on a computer. Capacity information for the computer is retrieved and is serialized in a serialized list in accordance with the policy. A demand for the workload is received and is a request for additional capacity of the computer. The demand for the workload is analyzed to determine whether the demand is characterized as a speed or a general purpose demand. Speed demand includes an increase in a speed level for the computer, and general purpose demand includes an increase in a speed level and/or a number of processors for the computer. An appropriate capacity is determined, from the serialized list, to add to the computer for the workload based on the analysis. The appropriate capacity of the computer is activated for the workload.

4 Claims, 5 Drawing Sheets

AUTOMATIC SPEED AND PROCESSOR CAPACITY UPGRADE ACCORDING TO THE WORKLOAD

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. The below listed application is hereby incorporated herein by reference in its entirety: DE9-2006-0016.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

Exemplary embodiments relate to a method for detecting different types of demands for workloads and to activating temporary resources for the workloads.

Today's high-end computers have a large number of processors. These processors are so powerful that adding another processor changes the capacity of this computer by a high amount. That is why, e.g., on a zSeries® machine, there is the ability to run the processor at various speed levels for general-purpose processors. With these two variables (number of processors and the processor speed) the processing capacity can be adjusted much more granularly. Table 1 below shows such configurations for a subset of a zSeries ® z9®-EC machine. Each cell in the table contains the information about the configuration identifier and the associated general-purpose capacity. General-purpose capacity is expressed in terms of million service units (MSU).

A zSeries machine may be called a central processor complex (CPC). Beginning with a configuration of nine processors, all processors are running with the maximum speed. In these computers, there are other specialty processors that can be used for other specific workloads, for example a Java workload.

TABLE 1

|         | 1 CP | 2 CP | 3 CP | 4 CP | 5 CP | 6 CP | 7 CP | 8 CP | 9 CP |
|---------|------|------|------|------|------|------|------|------|------|
| Speed 4 | 701  | 702  | 703  | 704  | 705  | 706  | 707  | 708  | 709  |
|         | 81   | 158  | 229  | 298  | 363  | 422  | 479  | 532  | 584  |
| Speed 3 | 601  | 602  | 603  | 604  | 605  | 606  | 607  | 608  | n/a  |
|         | 65   | 127  | 184  | 240  | 292  | 339  | 385  | 428  |      |
| Speed 2 | 501  | 502  | 503  | 504  | 505  | 506  | 507  | 508  | n/a  |
|         | 53   | 104  | 152  | 197  | 240  | 279  | 317  | 352  |      |
| Speed 1 | 401  | 402  | 403  | 404  | 405  | 406  | 407  | 408  | n/a  |
|         | 28   | 55   | 80   | 103  | 126  | 147  | 166  | 185  |      |

It is possible to partition these large computers to run multiple operating systems and operating system instances on them. For zSeries machines, such a partition is called a logical partition (LPAR). For each LPAR, it is possible to assign physical processors to the LPAR. Such processors can be dedicated to the LPAR, which means that the partition will exclusively use the assigned processors. In contrast, an LPAR can get assigned shared processors, which means that the processors are shared with other LPARs and that the physical processors get assigned to this or another LPAR whenever the processors are needed.

Customers usually buy a permanent configuration with the general-purpose capacity and a number of specialty processors that suits their current needs. Nevertheless, there are situations when more capacity is needed, for example, when an unexpected number of requests have to be processed. To account for such a situation, these computers are allowed to temporarily activate additional capacity. This additional capacity can be provided as additional processors, higher processors speed, or a combination of additional processors and higher speed for general-purpose capacity. For specialty processors only the number of processors can be increased.

Today, customers have to buy such temporary capacity by requesting the capacity configuration that they expect will resolve such unexpected situations in business. When the need arises, the customer can activate this target configuration. To allow for this, actual computers are built and delivered with more processors than the number bought by the customer.

However, such manual activation has some drawbacks. First, it may happen that the activated capacity does not help the workload that is suffering. This can be the case if the type of additional capacity cannot be absorbed or is of an incorrect type. In this situation, the customer had to pay for the activation but still did not fulfill the business needs. Another problem could be that the activated capacity is too high for the current situation, and thus the customer has to pay for more than is necessary.

To help in this situation, newer machines allow activating additional temporary capacity, for example to any target configuration shown in Table 2 below. The allowed target configurations for a customer may be limited by a maximum capacity to activate or by a maximum number of processors. The Table 2 shows allowed targets for general-purpose capacity that is allowed in the case that a customer bought a CPC with a permanent configuration (PC) of 3 general-purpose processors (CP) running at speed level 2. This configuration has the Id 503 and it has a capacity of 152 MSUs. If the additional temporary capacity is limited to not allow for more than double the capacity of the permanent configuration, then all the configurations in Table 2 can be activated.

TABLE 2

|         | 3 CP | 4 CP | 5 CP | 6 CP |
|---------|------|------|------|------|
| Speed 4 | 703  | 704  |      |      |
|         | 229  | 298  |      |      |
| Speed 3 | 603  | 604  | 605  |      |
|         | 184  | 240  | 292  |      |
| Speed 2 | 503  | 504  | 505  | 506  |
|         | 152  | 197  | 240  | 279  |
|         | PC   |      |      |      |

Usually, the customer would not want to activate the additional capacity just in case the machine is running near 100% utilization, which is a normal situation for mainframe computers. However, the additional capacity may need to be activated in case a business-critical workload does not fulfill its goal. This issue is addressed for particular resources, like specialty processors, in DE9-2006-0016, herein incorporated by reference.

The situation for general-purpose capacity is much more complex. The reason is that adding capacity with processors and adding capacity with higher speed does not have the same effect for all workloads. It would be beneficial to have a method for properly adding capacity.

SUMMARY

A method for automatically adding or reducing capacity to a computer for a workload in accordance with exemplary embodiments. Metric information is received about the workload running on a computer and about configurable available additional capacity of the computer. The workload that needs to be observed is determined by a policy. The metric data is analyzed to determine whether the workload fulfills its business goals. If not, the metric data is used to determine whether additional capacity can help to improve the workload. A demand for the workload is calculated. The demand may be a request for additional capacity of the computer, a request to reduce capacity of the computer, or a request to retain already activated additional capacity of the computer.

If a need for general-purpose capacity is detected, the demand for the workload is further analyzed to determine whether the demand is characterized as a speed demand or a general-purpose demand. The speed demand defines that an increase in a speed level for the computer can help the workload, and the general-purpose demand defines that an increase in a speed level and/or the number of processors for the computer can help the workload. Capacity information for the computer is retrieved, and the capacity information for allowed target configurations is ordered in a serialized list based on the capacity of the target configuration. A demand is calculated for the workload, which may be a request for additional capacity or a request to reduce capacity of the computer. The demand for the workload is analyzed. An appropriate capacity is determined, from the serialized list, to add capacity to the computer for the workload based on the analysis or to reduce capacity. The appropriate capacity of the computer is activated or deactivated for the workload. A step in the serialized list is assigned to the demand in accordance with the activation or deactivation of the appropriate capacity of the computer.

Additional features and advantages are realized through techniques of the present invention. Exemplary embodiments are described in detail herein and are considered a part of the claimed invention. For a better understanding of the exemplary embodiments, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

Figure 1:
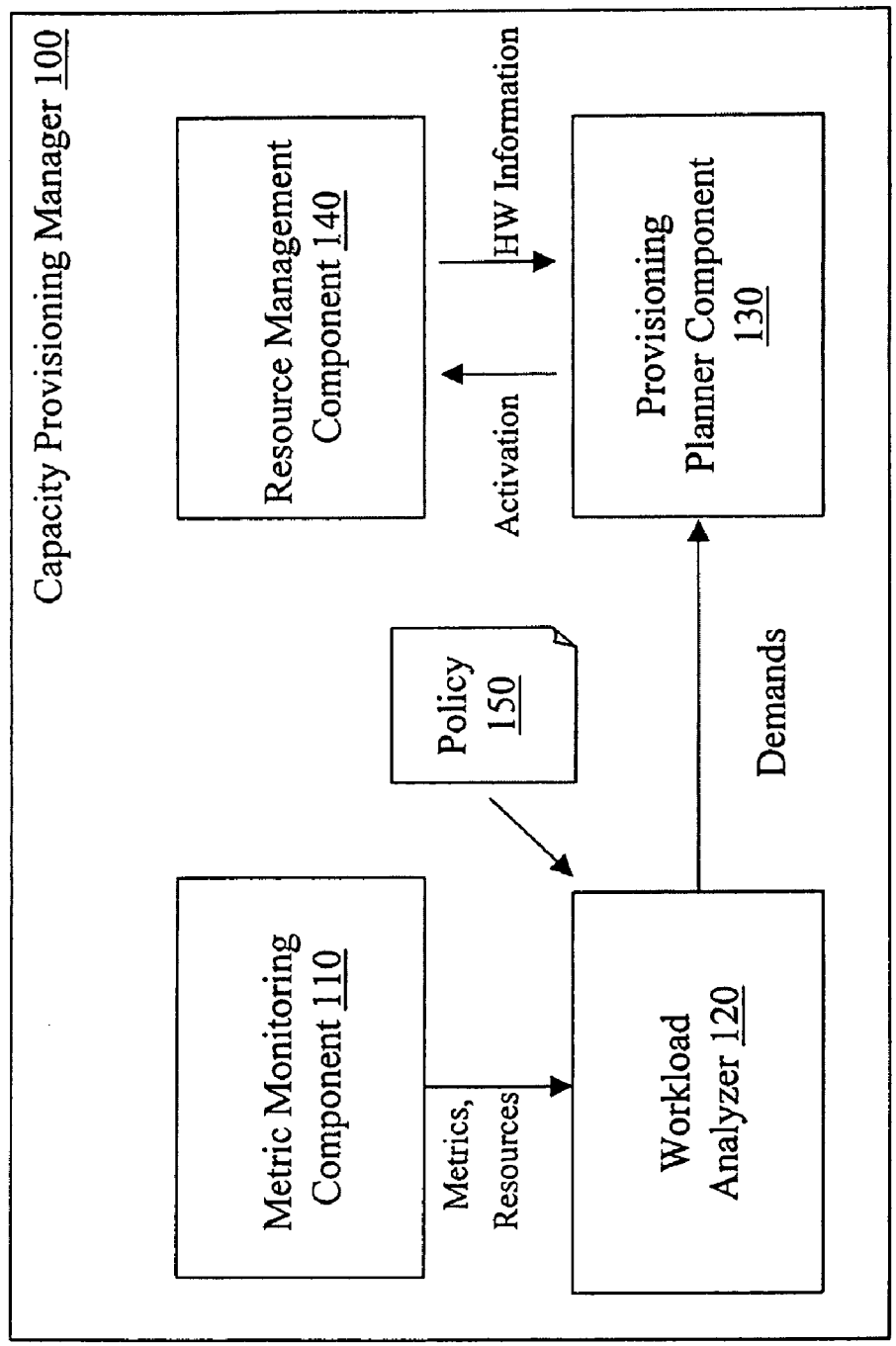
FIG. 1 illustrates one example of a capacity provisioning manager in accordance with exemplary embodiments.

In computers, the effects of adding capacity with processors and adding capacity with higher speed are not the same for different workloads. Exemplary embodiments address issues of how to find out which type of additional capacity is needed and how to activate the additional capacity based on this knowledge by using a capacity provisioning manager 100 as shown in FIG. 1. The capacity provisioning manager 100 may include a metric-monitoring component 110, a workload analyzer 120, a provisioning planner component 130, and a resource management component 140. The various features of the capacity provisioning manager 100 may be implemented as an application in, e.g., a zSeries® machine.

In exemplary embodiments, processing may be driven by a policy 150. The policy 150 describes which workloads can trigger the activation of additional resources, and the policy 150 defines the conditions under which the resources need to be activated or deactivated. These conditions are expressed in terms of a performance index (PI), which is a criterion that specifies how well the workload is working towards its goal. If the actual PI of the workload exceeds the defined PI limit, additional capacity may be activated. The issues of how to define goals for workloads and how to calculate a PI are addressed in U.S. Pat. No. 5,473,773, herein incorporated by reference. The policy 150 assists in assigning resources for a goal-oriented resource management. The policy 150 discussed herein is not meant to be limiting, and it is understood that the guidelines for the policy 150 may be set in accordance with business needs or hardware resources.

In the policy 150, the customer can also specify how many resources are allowed to be activated for a workload. For general-purpose capacity, the amount of capacity allowed to be activated is expressed in terms of million service units (MSU), which is a measurement to compare the capacity of different configurations.

Figure 2:
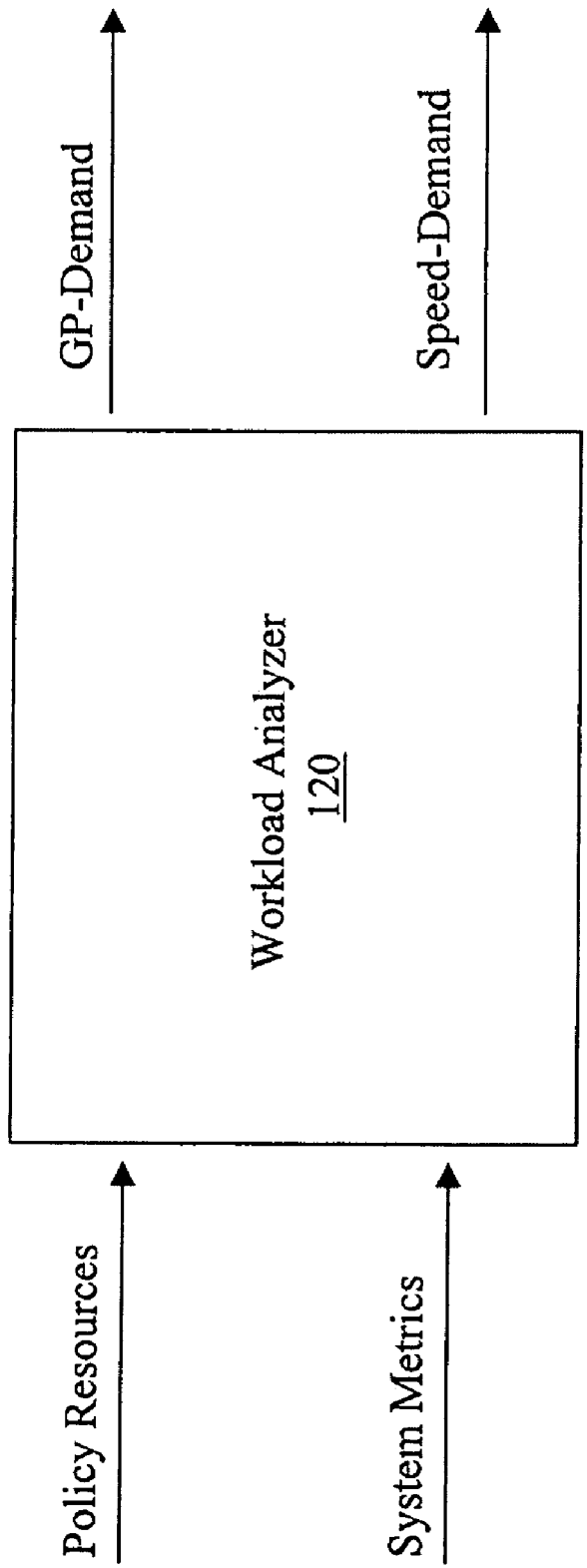
FIG. 2 illustrates an example of a workload analyzer in accordance with exemplary embodiments.

The metric-monitoring component 110 of the capacity provisioning manager 100 may retrieve a large set of metrics about the workload specified in the policy 150. Besides the actual PI values for all specified workload, the metrics may include, for example, the different delays of the workload, the number of shared and dedicated processors of the LPAR, the utilization of the physical and logical processors, and the allowed share of the LPAR. As illustrated in FIG. 2, the workload analyzer 120 uses these metrics to calculate different demands for this workload in accordance with exemplary embodiments. For general-purpose capacity, two types of demands can be generated: unqualified capacity demands (general-purpose demands) and speed demands, and the workload analyzer 120 generates the general-purpose demands and the speed demands as shown in FIG. 2 in accordance with exemplary embodiments. An unqualified capacity demand (general-purpose demand) is generated for a workload that needs additional general-purpose capacity where any type of additional capacity, such as more processors and more speed, would help. A speed demand is generated for a workload that would benefit only from higher processor speed.

Figure 5:
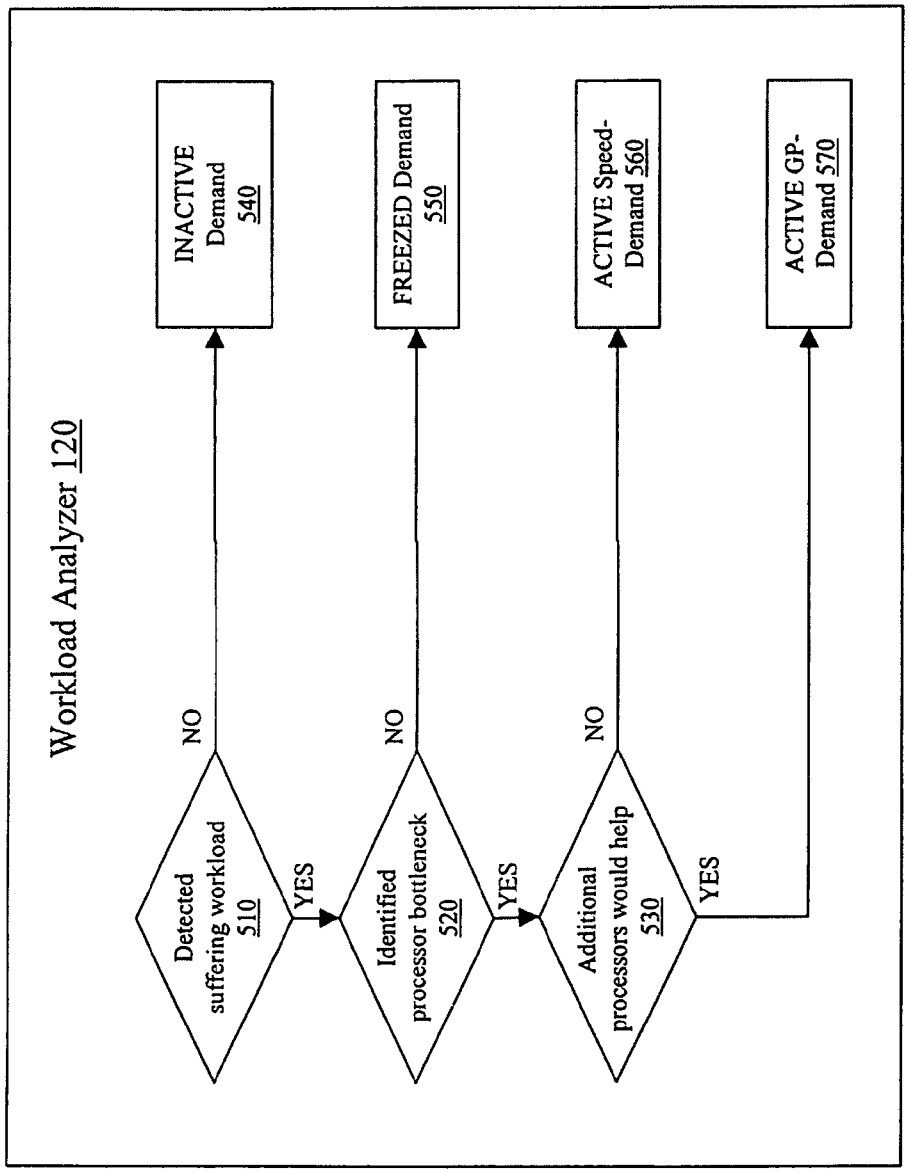
FIG. 5 illustrates an example of determining the capacity demand and demand state of a workload in accordance with exemplary embodiments.

FIG. 5 illustrates an example of a flow of decisions that the workload analyzer 120 makes in order to determine the type of demand that would help to relieve the suffering workload in accordance with exemplary embodiments. The decisions of the workload analyzer 120 in FIG. 5 provide non-limiting illustrations to refine the concept of demands for workloads by demonstrating use of different demand states.

In exemplary embodiments, based on the aforementioned metrics, the first decision step at 510, which detects a suffering workload, can read the performance index (PI) of the concerned workload that is being provided by the metric monitoring component 110, and compare the workload with the respective PI limit delivered by the policy 150. In the case that the PI limit has not been exceeded by the current PI of the workload (e.g., NO at decision step 510), the workload analyzer 120 may decide that the workload has no demand for additional capacity at all, and the provisioning planner component 130 is informed about this decision with an INACTIVE demand 540 for that specific workload. This kind of demand (the INACTIVE demand 540) indicates that resources which already have been activated by the capacity provisioning manager 100 on behalf of this workload are no longer needed since the workload is no longer suffering.

If the preceding check at decision step 510 detects a suffering workload (e.g., YES at decision step 510), decision step 520 determines whether the suffering workload is caused by a processor bottleneck or other reasons. Exemplary embodiments may use metrics (e.g., such as the workload's delay caused by processor bottleneck and such as the utilizations of physical and logical processors used by the workload) from the metric monitoring component 110, and compare the metrics against appropriate thresholds defined in the policy 150. If the decision step 520 determines that the workload does not suffer from processor shortages (e.g., NO at decision step 520), the workload analyzer 120 will notify the provisioning planner component 130 with a FREEZED demand 550. The FREEZED demand 550 indicates that the workload is still suffering but additional processing capacity would not help. This kind of demand (the FREEZED demand 550) also indicates that resources which already have been activated by the capacity provisioning manager 100 on behalf of this workload should be kept because the workload is still suffering.

Whenever the preliminary checks for detecting suffering workload at the decision step 510 and identifying a processing capacity bottleneck at the decision step 520 apply for a workload (e.g., YES at decision step 520), decision step 530 performs a decisive check to determine the appropriate type of demand for additional capacity at the decision step 530, exemplary embodiments may exploit metrics, such as the number of available spare processors, in order to determine if a temporary activation would be possible at all. In a virtualization environment, another check may compare the amount of logical processors assigned for the workload with that of the physical processors after activation, so that the workload analyzer 120 can detect whether the additional capacity would be available for the suffering workload at the decision step 530. Further, for a workload running in a logically partitioned environment, such as the zSeries machines LPAR, the partition's weight after an activation of a processor can be tested against the partition's allowed limit at the decision step 530.

If at least one of the checks contained in the decision step 530 fails, this failure indicates that an activation of additional processors would not benefit the suffering workload, but an increase of the processor speed would be useful. In that case (e.g., NO at decision step 530), an ACTIVE speed demand 560 will be sent to the provisioning planner component 130.

If all of the checks contained in the decision step 530 have a positive outcome, the workload analyzer 120 notifies the provisioning planner component 130 that the workload needs and would profit from additional capacity provided either by higher processor speed levels or additional temporary general purpose processors. In the case of the positive outcome (e.g., YES at decision step 530), an ACTIVE general purpose demand 570 will be sent to the provisioning planner component 130.

Referring back to FIG. 1, the resource management component 140 of the capacity provisioning manager 100 retrieves information about the hardware and the allowed target configurations that are available based on the temporary capacity purchased by the customer. This information is reported to the provisioning planner component 130. As a non-limiting example, the resource management component 140 can read and retrieve central processor complex (CPC) capacity information. This CPC information contains (in addition to the allowed configurations) the actual configuration, for example, the permanent and current number of physical processors of each type, the permanent and actual capacity, and the number of processors that can still be activated.

Figure 3:
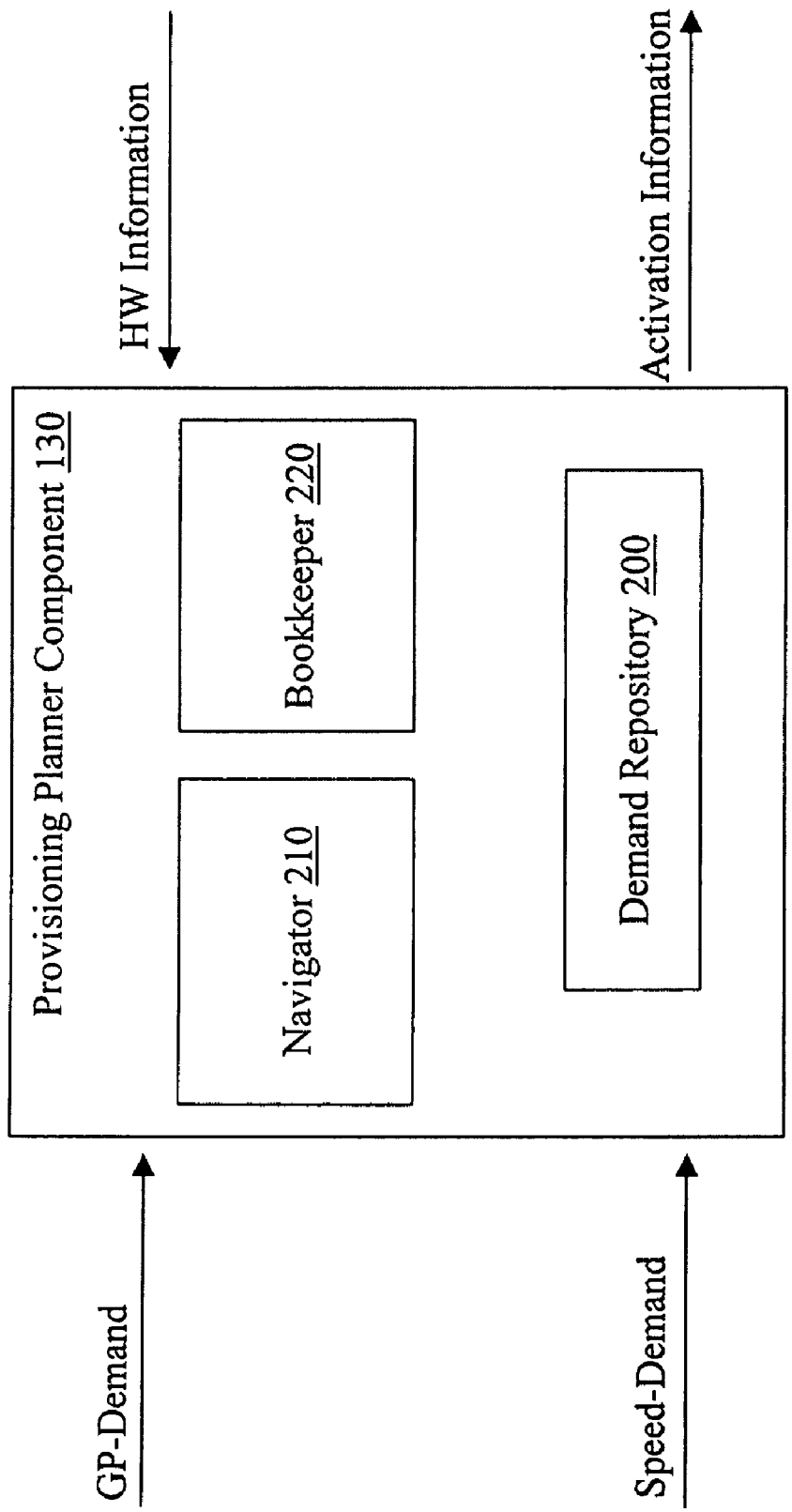
FIG. 3 illustrates an example of a provisioning planner component in accordance with exemplary embodiments.

FIG. 3 illustrates an example of interfaces of the provisioning planner component 130 in accordance with exemplary embodiments. The provisioning planner component 130 receives inputs of the general purpose capacity (GP) demands and the speed demands for a workload (from the workload analyzer 120 shown in FIG. 1). In addition, the provisioning planner component 130 also receives hardware information (from the resource management component 140 shown in FIG. 1), which contains the current configuration, the possible target configurations, and the information associated with both of them. Associated information may include the capacity in terms of MSU, the number of additional processors, and the number of additional speed steps. The hardware information may, e.g., be CPC capacity information. The provisioning planner component 130 computes the required changes in the activation level and passes this as output to the resource management component 140.

The provisioning planner component 130 may include a demand repository 200 which is an internal storage that collects all GP-demands and all speed-demands. Whenever an update to a demand occurs, a new demand occurs, or a demand vanishes, this change is updated in the demand repository 200.

Based on all capacity demands (such as GP-demands and speed-demands) and the information about the available target configurations of the CPC, the provisioning planner component 130 may utilize a navigator 210 to calculate whether additional capacity needs to be activated or whether active temporary capacity can be deactivated. The calculation of the navigator 210 starts by serializing all allowed target configurations and ordering the target configurations in accordance with the capacity that the target configurations represent (as illustrated in Table 3 below). The ordering calculation of the navigator 210 is relative to the permanent capacity (PC) of the CPC as shown in Table 2.

Table 3 illustrates a non-limiting example of a serialized list of the Table 2 performed by the navigator 210. In the serialized list, duplicate entries with the same capacity can be removed from the serialized list such that only one of the duplicate entries remains. These entries in the serialized list of Table 3 represent different configurations of the hardware (e.g., different configurations of the CPC). Since higher speed will always help while additional processors might not always help, the entry with the higher number of processors may be removed from the serialized list, leaving the entry with less processors but higher processor speed.

Configuration 503 represents the permanent configuration (PC) in Table 3. Configuration 504 is the actual (active) configuration in Table 3. An entry in the list contains (in addition to the configuration identifier), the capacity relative to the permanent configuration (PC) and the number of resources that are active for this configuration in terms of number of processors and number of increases in speed. For example, the entry for the configuration of configuration 605 according to Table 2 has 292 MSU, a difference of 140 MSU compared to the capacity of the permanent 152 MSU of the permanent configuration 503. The configuration differs by 2 processors and 1 speed level. As an entry with 88 MSUs, the configuration 604 remains in the serialized list, while the entry for configuration 505 (which was previously in Table 2) is removed as shown in Table 3. Each entry in the serialized list may be referred to as an unqualified capacity step.

TABLE 3

| 503 | 603 | 504 | 703 | 604* | 506 | 605 | 704 |
|---|---|---|---|---|---|---|---|
| (0) | (32) | (45) | (77) | (88) | (127) | (140) | (146) |
| (0/0) | (0/1) | (1/0) | (0/2) | (1/1) | (0/3) | (2/1) | (1/2) |
| PC |  | Actual |  |  |  |  |  |

The resulting serialized list in Table 3 may be reduced further, if there are unqualified capacity steps that vary only by a small number of MSUs from neighboring unqualified capacity steps. As a non-limiting example, a criterion of which entry to remove may be that for entries with the same capacity one of the entries is removed.

The entries in the serialized list get assigned a step number. In the case for the serialized list in Table 3, step number 1 would be assigned to configuration 603, step number 2 would be assigned to configuration 504, step number 3 would be assigned to configuration 703, step number 4 would be assigned to configuration 604, and so on until step number 7 is assigned to configuration 704.

The provisioning planner component 130 sums up all the capacity that is allowed for all unqualified capacity demands (i.e., general purpose demands). The result of the summation of the provisioning planner component 130 for all the capacity that is allowed for all unqualified capacity demands is called allowed unqualified capacity (A). The provisioning planner component 130 also sums up all the unqualified capacity demands that have already been activated for the unqualified capacity demands. The result of this summation for all the unqualified capacity demands that have already been activated is called active unqualified steps (B), and the state of each demand is checked.

Moreover, the demand state is defined by the workload analyzer 120 when it specifies the demand for a workload. For example, different states are shown in FIG. 5. In FIG. 5, INACTIVE demands 540 indicate that the workload is not suffering and therefore does not need temporary capacity supplied by the capacity provisioning manager 100 at all, not even already activated capacity. FREEZED demands 550 mean that the workload is suffering, but the workload cannot be helped with additional processor capacity of any kind. ACTIVE demands 560 and 570 express that the workload is suffering and can be helped with the further specified type of demand: either speed or general purpose (GP), the latter comprising temporary processor activation or higher processor speed.

The demand state is combined to one unqualified demand state (C). The unqualified demand state (C) is ACTIVE if there is at least one demand state that is ACTIVE, and the unqualified demand state (C) is INACTIVE if all demand states are INACTIVE. Otherwise, the combined unqualified demand state is FREEZED.

The same operation is done for all speed demands, resulting in the allowed speed capacity (D), the active speed steps (E), and speed demand state (F). The provisioning planner component 130 sums up all the capacity that is allowed for all speed demands. The result of the summation of the provisioning planner component 130 for all the capacity that is allowed for all speed demands is called allowed speed capacity (D). The provisioning planner component 130 also sums up all the speed demands that have already been activated for the speed demands. The result of this summation for all the speed demands that have already been activated is called active speed steps (E), and the state of each speed demand is checked. The demand state is combined to one speed demand state (F). The speed demand state (F) is ACTIVE if there is at least one speed demand state that is ACTIVE, and the speed demand state (F) is INACTIVE if all demand states are INACTIVE. Otherwise, the combined speed demand state is FREEZED.

Based on values of the unqualified demand state (C) and the speed demand state (F), the provisioning planner component 130 checks whether an activation or deactivation is needed. The unqualified demand state (C) and the speed demand state (F) are used to calculate the needed unqualified steps (G) and the needed speed steps (H). As a non-limiting example, if the unqualified demand state (C) and speed demand state (F) are ACTIVE, then the needed unqualified steps (G) is set to the value of the active unqualified steps (B) plus one and the needed speed steps (H) is set to the value of the active speed steps (E). As another non-limiting example, if only the speed demand state (F) is ACTIVE, then the needed unqualified steps (G) is set to the value of the active unqualified steps (B) and the needed speed steps (H) is set to the value of the active speed steps (E) plus one. This results in activation of temporary capacity, if allowed (e.g., if hardware resources are available).

As a non-limiting example, if the unqualified demand state (C) and speed demand state (F) are both INACTIVE and the active unqualified steps (B) is greater 0, then the needed unqualified steps (G) is set to the value of the active unqualified steps (B) minus 1, and the needed speed steps (H) is set to the value of the active speed steps (E). Otherwise, if the active unqualified steps (B) equals to 0, and the active speed steps (E) is greater 0, then the needed unqualified steps (G) is set to the value of the active unqualified steps (B), and the needed speed steps (H) is set to the value of the active speed steps (E) minus 1.

In any other combination, the needed unqualified steps (G) may be set to the value of the active unqualified steps (B), and the needed speed steps (H) may be set to the value of the active speed steps (E).

Values of the needed unqualified steps (G) and the allowed unqualified capacity (A) are now used to navigate the unqualified demands. Navigation is performed by traversing the possible targets of the serialized list (in Table 3) starting at the permanent capacity (PC) configuration. Navigation continues to the next step until the allowed unqualified capacity A >=(greater than or equal to) the MSU value assigned to the step and the step number is <=(less than or equal to) the needed unqualified steps (G). The resulting configuration of this navigation is called the unqualified target. The resulting configuration of the unqualified target has the number of additional processors I and the number of additional speed levels J.

Values of the needed speed steps (H) and the allowed speed capacity (D) may be used to further navigate the speed demands. Starting with the unqualified target, the navigation traverses any remaining configurations to find an entry for which the entry's MSU value <=(less than or equal to) A+D. In addition, the number of additional processors and the number of speed steps of the possible entry is checked. If the number of processors of the entry is the same as the number of processors of the unqualified target and the number of additional speed levels is less than I+H, then the final target is positioned to the current entry. If the number of processors of the entry is lower than the number of processors of the unqualified target but the number of additional speed levels is <=H, then the final target is positioned to the current entry.

The calculated target is compared to the active configuration (e.g., configuration 504 in the example of Table 3). If the new target configuration has higher capacity, then an activation to the new target configuration is performed. If the new target configuration has less capacity, then a deactivation to the new target configuration is performed. Otherwise, the calculated target is the same as the actual active configuration, and no action is necessary.

The navigation is based on the information about already associated navigation steps and speed steps for the demands. The already associated navigation steps are the steps that have been assigned to the demands in a previous run of the bookkeeping phase. Actual assignment of navigation steps and speed steps to the demands is performed by a bookkeeper 220 in FIG. 4. The process of the bookkeeper 220 starts with the serialized list of possible target configurations and the information about the currently active configuration shown as the current configuration (CC) in Table 4. Also, the permanent configuration (PC) is shown in Table 4.

TABLE 4

| 503 | 603 | 504 | 703 | 604 | 506 | 605 | 704 |
|---|---|---|---|---|---|---|---|
| (0) | (32) | (45) | (77) | (88) | (127) | (140) | (146) |
| (0/0) | (0/1) | (1/0) | (0/2) | (1/1) | (0/3) | (2/1) | (1/2) |
| PC | | | | | | CC | |

First, the bookkeeper 220 assigns navigation steps to the GP demands. This is done on the same serialized list (in Table 4) of possible target configurations for the navigation. The bookkeeper 220 assigns an additional step to each ACTIVE demand, and one step less to each INACTIVE demand. The assigned number of steps to FREEZED demands stays at its current level. During this processing of the bookkeeper 220, a pointer is run through the serialized list of Table 4, and each time, the pointer goes forward the number of steps assigned to a GP-demand once the GP-demand is processed. At the end of this processing, the final configuration is used to calculate the remaining speed steps up to the currently active configurations, which is the current configuration (CC) in Table 4.

If the active configuration (CC) has a different number of processors than the current bookkeeping configuration, then the number of remaining speed steps is the difference of the speed level between the active target configuration and the current bookkeeping configuration. Otherwise, the number of remaining speed steps is the number of active speed levels associated with the active target configuration. The number of remaining speed steps is used to assign speed steps to the speed demands. Similar to the GP-demands, ACTIVE speed demands get assigned an additional speed demand, INACTIVE speed demands get assigned one speed step less, and FREEZED speed demands maintain their assigned number of speed demands.

At the end of this process of the bookkeeper 220, usually all capacity is distributed to the demands. In some situations, some steps may be left, and the process attempts to assign the remaining steps to active demands. If there are speed steps left and there are active demands, then the active demands already assigned speed steps are increased by the remaining number. If this is not possible, the bookkeeper 220 calculates the number of remaining navigation steps between the current bookkeeping configuration and the actually active configuration. The result of this calculation is then assigned to a GP demand, if possible.

If the bookkeeping process of the bookkeeper 220 is over, the provisioning planner component 130 can start planning again.

Figure 4:
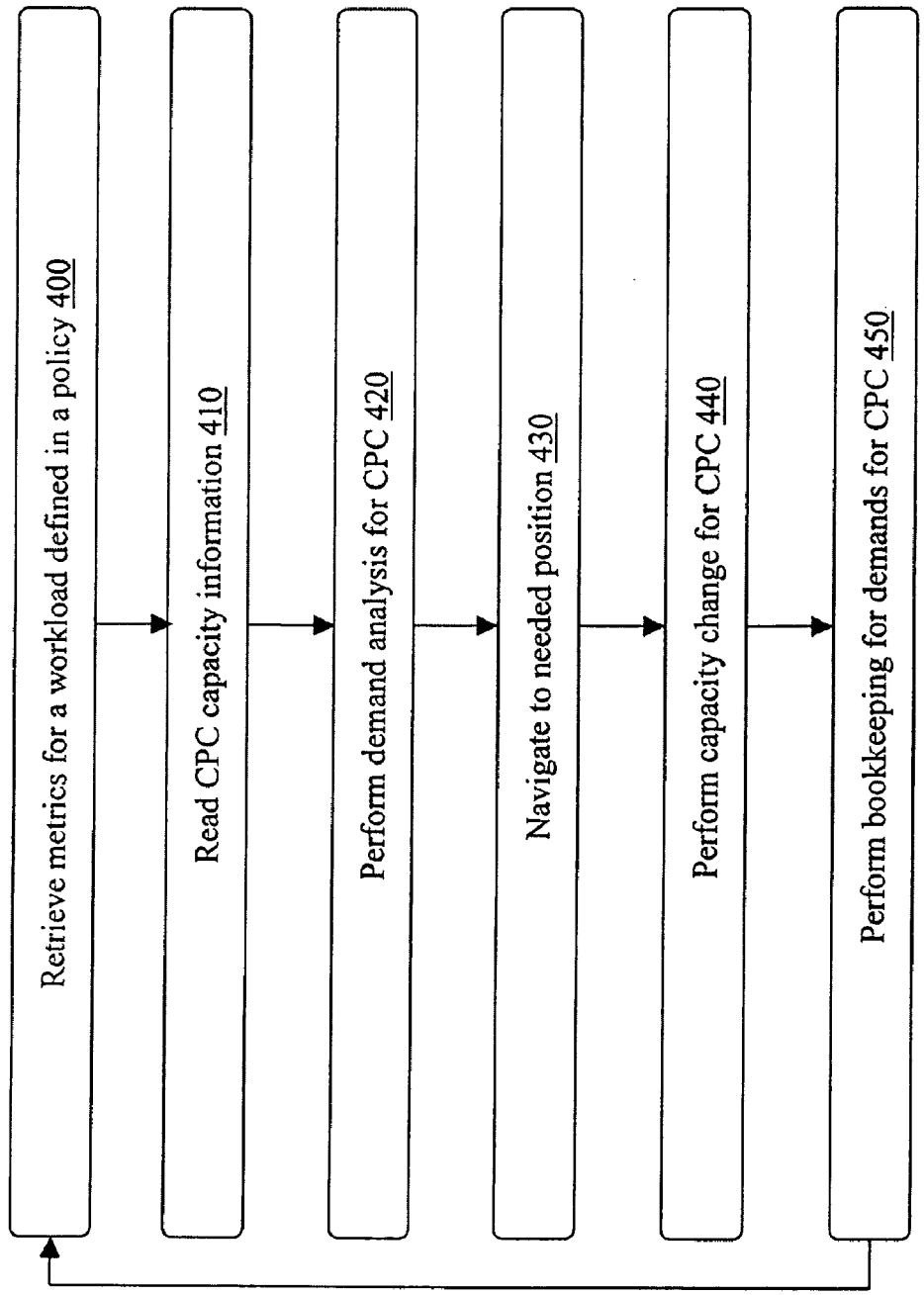
FIG. 4 illustrates a method for modifying capacity based on a workload in accordance with exemplary embodiments.

FIG. 4 illustrates a method for adding or reducing capacity based on a workload in accordance with exemplary embodiments. The method allows for automatic processor upgrade for one or more partitions of a computer (e.g., central processor complex (CPC) or zSeries computer) in accordance with exemplary embodiments.

In exemplary embodiments, metrics are retrieved by the metric monitoring component 110 for a workload defined in the policy 150 at 400. CPC capacity information is read (and/or retrieved) by the resource management component 140 at 410. The capacity information for the computer may be ordered in a serialized list (as shown in Tables 3 and 4) in accordance with the policy 150 for the workload.

A demand analysis is performed by the workload analyzer 120 for the CPC at 420. In exemplary embodiments, the workload analyzer 120 may determine whether a speed demand and/or a general purpose demand are needed for the workload in accordance with the policy 150. To satisfy a speed demand, an increase in processor speed is required. To satisfy a general purpose demand, an increase in processor speed and/or an increase in the number of processors may be required. It may also be determined that the demand is already met and/or that the demand being met with the current capacity.

The needed configuration is navigated to by the navigator 210 at 430. An appropriate capacity is determined by the navigator 210 from the serialized list for the workload. Based on the CPC capacity information, the navigator 210 navigates to the appropriate configuration of the serialized list.

A capacity change is performed by the provisioning planner component 130 for the CPC at 440. The provisioning planner component 130 can direct the resource management component 140 to activate (or deactivate) the appropriate CPC resources (capacity) for the workload. In exemplary embodiments, determining the appropriate capacity may take into account additional capacity already activated for the workload. In exemplary embodiments, determining the appropriate capacity may sum up the states of a plurality of demands to an overall state. The overall state may be considered ACTIVE if at least one of a plurality of workloads on the computer is suffering and requires additional capacity. The overall state may be considered INACTIVE, such that capacity can be deactivated, if the plurality of demands indicate that all goals are fulfilled. Also, the overall state may be considered FREEZED, such that a current active configuration needs to stay activated, in all other situations.

After a capacity change has been performed, the bookkeeper 220 changes the assigned navigation steps and speed step for each demand associated with the CPC at 450.

Further, in exemplary embodiments, activating the appropriate capacity of the computer for the workload comprises activating a configuration that has one more step than a current configuration in the serialized list. The one more step for general purpose demands may comprise the configuration in the serialized list that is next to the current configuration and that has more capacity than the current configuration. The one more step for speed demands may comprise the configuration in the serialized list that has more capacity than the current configuration and that has one more speed increment than the current configuration.

The above method has been explained utilizing a CPC computer for explanatory purposes, and it is understood that exemplary embodiments are not limited to a CPC computer.

In exemplary embodiments, a virtualized computer system may be used, and metric information of logical and physical capacity can be evaluated to determine the benefit of speed demands and/or general purpose demands for the workload. Also, in exemplary embodiments, a logically partitioned computer may be used, in which metric information of a partition weight limit can be evaluated, and the weight limit continues to be met after activating the appropriate capacity of a computer.

The capabilities of the present invention can be implemented in software, firmware, hardware or some combination thereof.

As one example, one or more features of the exemplary embodiments can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for automatically adding or reducing capacity to a computer for a workload, the method comprising:

receiving metric information, defined in a policy, about a workload running on a computer and configurable available additional capacity of the computer;

retrieving capacity information for the computer, wherein the capacity information is serialized in a serialized list in accordance with the policy;

calculating a demand for the workload, wherein the demand is a request for additional capacity of the computer, a request to reduce capacity of the computer, or a request to retain already activated additional capacity of the computer;

analyzing the demand for the workload to determine whether the demand is characterized as a speed request or a processor request, wherein the speed request comprises an increase in a speed level for the computer, and wherein the processor request comprises an increase in a number of processors for the computer;

analyzing the demand for the workload to determine whether the demand is met;

determining an appropriate capacity, from the serialized list, to add to the computer for the workload based on the analysis or determining the appropriate capacity to decrease for the workload based on the analysis;

activating the appropriate capacity of the computer for the workload or deactivating the appropriate capacity, in response to the determining the appropriate capacity;

wherein the serialized list comprises a plurality of steps, each step comprises a speed and number of processors in accordance with the policy; and wherein determining the appropriate capacity comprises selecting one of the plurality of steps in the serialized list.

2. The method of claim 1, wherein in a virtualized computer system, metric information of logical and physical capacity is evaluated to determine a benefit of the speed request or the processor request for the workload.

3. The method of claim 1, wherein activating the appropriate capacity of the computer for the workload comprises activating a configuration that has a one level capacity increase over a current configuration in the serialized list.

4. The method of claim 1, wherein determining the appropriate capacity sums up states of a plurality of demands to an overall state;

wherein the overall state is active if at least one of a plurality of workloads on the computer is suffering and requires additional capacity; and wherein the overall state is inactive, such that capacity can be deactivated, if the plurality of demands indicate that all goals are fulfilled.

* * * * *